United States Patent
Lyon

(10) Patent No.: US 7,788,429 B2
(45) Date of Patent: Aug. 31, 2010

(54) CROSS COUPLED UNIDIRECTIONAL DATA RING

(75) Inventor: Terry L. Lyon, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/110,795

(22) Filed: Apr. 28, 2008

(65) Prior Publication Data

US 2009/0268638 A1    Oct. 29, 2009

(51) Int. Cl.
*G06F 13/00*    (2006.01)
*G06F 15/16*    (2006.01)
*H04L 12/42*    (2006.01)
*H04L 12/28*    (2006.01)

(52) U.S. Cl. .............. 710/104; 710/100; 370/258; 709/251

(58) Field of Classification Search ............ 710/104
See application file for complete search history.

(56) References Cited

U.S. PATENT DOCUMENTS

| 5,127,067 A | * | 6/1992 | Delcoco et al. ............ 385/24 |
| 6,848,006 B1 | * | 1/2005 | Hermann ................. 709/239 |
| 6,990,064 B2 | * | 1/2006 | Son et al. ................ 370/221 |
| 7,675,899 B2 | * | 3/2010 | Acharya et al. ........... 370/351 |
| 2006/0230310 A1 | * | 10/2006 | Nobakht et al. ............ 714/12 |

* cited by examiner

*Primary Examiner*—Ryan M Stiglic
(74) *Attorney, Agent, or Firm*—Bockhop & Associates LLC

(57) ABSTRACT

In a data communication system for communicating data between a plurality of data communicating entities, data is transmitted simultaneously from at least a first data communicating entity and a second data communicating entity onto a serial data ring. A first portion of the serial data ring is cross coupled to a second portion of the serial data ring so that data from the first data communicating entity avoids conflict with data from the second data communicating entity, thereby emulating a forward and reverse transmission on a single unidirectional serial ring.

8 Claims, 2 Drawing Sheets

CROSS COUPLED UNIDIRECTIONAL DATA RING

BACKGROUND OF THE INVENTION

1. Field of the Invention

The present invention relates to data communication systems and, more specifically, to a data communication system employing a unidirectional data ring.

2. Description of the Prior Art

Certain types digital communication chips require high speed distribution of streaming data between several different communicating entities. Certain applications require several different data streams to operate in parallel at a high bandwidth. For example, a processor may stream data to a memory for buffering and then the memory may stream the buffered data to an input/output circuit (I/O). At the same time new data may be streaming through the I/O to a memory buffer, and then to the processor. This type of application has a forward flow (from processor to I/O) and a backward flow (from I/O to processor) operating at the same time.

This high speed and parallel interconnection can be accomplished using several approaches, including: a full crossbar switch, a partially populated crossbar switch, a multi-ring bus, and a standard multi-drop bus. A ring bus is a good approach for very high bandwidth applications that require very large buses. The ring bus can interconnect various units in a ring using a large data bus.

As shown in FIG. 1, a bi-directional ring may be employed to allow back communication of data. In the example shown, a plurality of communicating entities 18 are coupled to both a first data ring 10 that transmits data in a first direction and a second data ring 12 that transmits data in a second direction, opposite from the first direction. Each communicating entity 18 is coupled to the first data ring 10 and the second data ring 12 with an access unit 14, which is a device that multiplexes an incoming data packet to its intended destination.

As performance requirements increase, wider busses must be employed. The increased width of a data ring bus results in more chip area being dedicated to the data ring and more complex wiring. Employing a bi-directional ring results in twice the wiring and chip area being dedicated to data communication.

Therefore, there is a need for a single data communication ring that facilitates simultaneous data transmission in both directions between more than a single entity.

SUMMARY OF THE INVENTION

The disadvantages of the prior art are overcome by the present invention which, in one aspect, is a system for facilitating transfer of data that includes a single unidirectional data communication ring. A plurality of controllable access units is spaced apart along and is coupled to the data communication ring. Each access unit includes a ring input, a secondary input, a ring output, and a secondary output. Each access unit is configured to couple the ring input to a selected one of the ring output or the secondary output and is configured to couple the secondary input to a selected one of the ring output or the secondary output. A first cross-coupling access unit is coupled to the data communication ring. The cross-coupling access unit includes a ring input, a secondary input, a tertiary input, a ring output, a secondary output, and a tertiary output. The cross-coupling access unit is configured to couple the ring input to a selected one of the ring output, the secondary output or the tertiary output. The cross-coupling access unit is also configured to couple the secondary input to a selected one of the ring output, the secondary output or the tertiary output. The cross-coupling access unit is also configured to couple the tertiary input to a selected one of the ring output, the secondary output or the tertiary output. A first cross coupler couples the secondary input of a first selected access unit of the plurality of controllable access units to the secondary output of the first cross-coupling access unit and couples the secondary output of the first selected access unit to the secondary input of the first cross-coupling access unit. A plurality of data communicating entities is each coupled to a different one of the plurality of controllable access units or the cross-coupling access unit. A control circuit is configured to drive all of the access units into a predetermined state to facilitate simultaneous communication between more than two of the data communicating entities.

In another aspect, the invention is a method for communicating data between a plurality of data communicating entities, in which data is transmitted simultaneously from at least a first data communicating entity and a second data communicating entity onto a serial data ring. A first portion of the serial data ring is cross coupled to a second portion of the serial data ring so that data from the first data communicating entity avoids conflict with data from the second data communicating entity.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
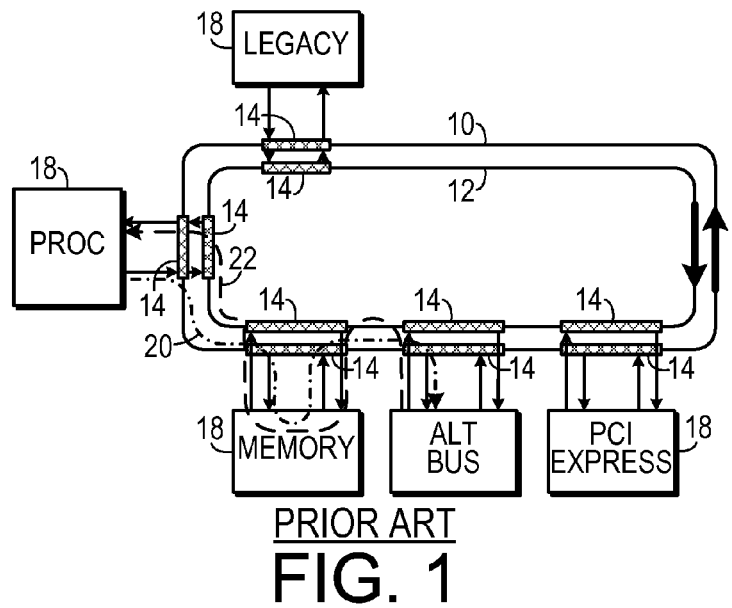
FIG. 1 is a schematic diagram of a prior art data communication system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
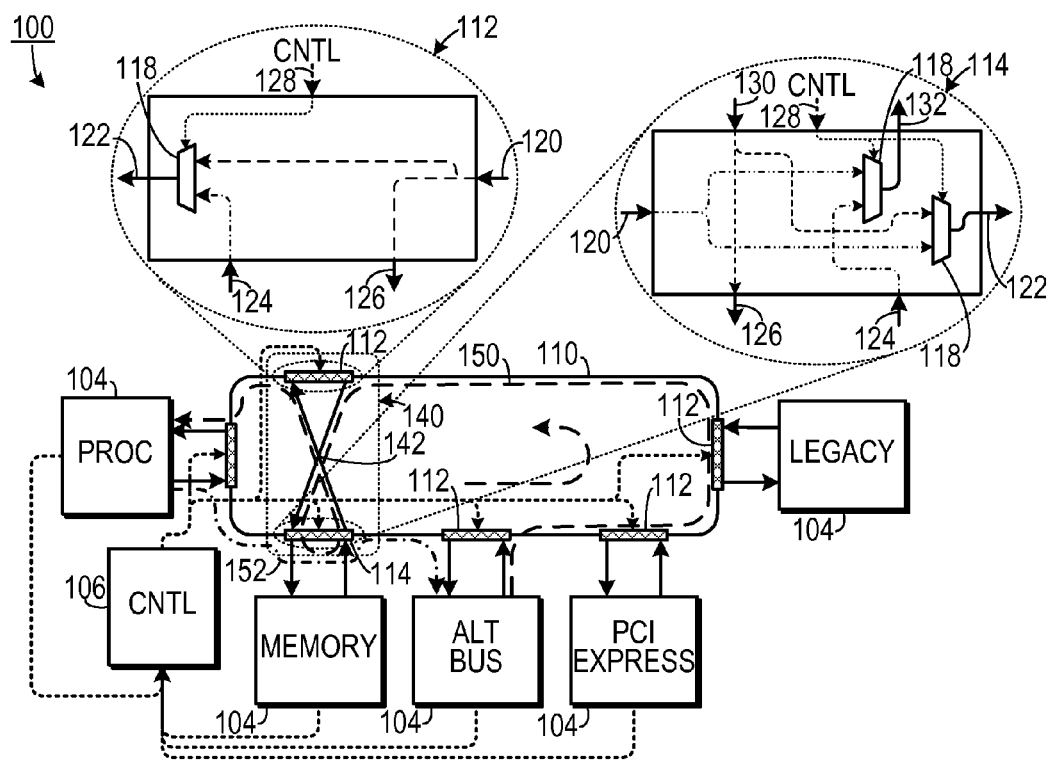
FIG. 2 is a schematic diagram of a first representative embodiment of a cross coupled unidirectional data ring.

As shown in FIG. 2, one representative embodiment of a system for facilitating transfer of data 100 includes a single unidirectional data communication ring 110 to which a plurality of controllable access units 112 are coupled so as to be spaced apart along the data communication ring 110. Each access unit 112 includes: a ring input 120 that receives data from the data ring 110; a secondary input 124 that receives data from a communicating entity 104 coupled thereto; a ring output 122 that transmits data to the data ring 110; and a secondary output 126 that transmits data to the communicating entity 104. Data from inputs 120 is transmitted to the ring output 122.

A cross-coupling access unit 114 is also coupled to the data communication ring 110. Like the controllable access units 112, the cross-coupling access unit 114 includes a ring input 120, a secondary input 124, a ring output 122 and a secondary output 126. In addition, the cross-coupling access unit 114 also includes a tertiary input 130 and a tertiary output 132. Multiplexing devices 118 are used to couple the inputs with the outputs based on a value of the control signal 128.

A cross coupling unit 140 is used to cross couple one part of the serial data ring 110 to another part of the serial data ring 110. The cross coupling unit 140 includes one of access units 112, the cross-coupling access unit 114 and a cross coupler 142. The cross coupler 142 (which could be embodied as a pair of data channels) couples the secondary input 124 of a selected one of access units 112 to the secondary output 126 of the cross-coupling access unit 114 and the secondary output 126 of the selected access unit 112 to the secondary input 124 of the first cross-coupling access unit 114.

A plurality of data communicating entities 104 are each coupled to a different one of the plurality of controllable access units 112 or the cross-coupling access unit 114. Examples of data communicating entities include digital memory units, interface units for alternate buses (such as non-serial buses), multi-lane digital communication systems, such as a peripheral component interface busses (also referred to as "PCI Express"), and legacy data communication systems. A processor may also be a type of data communicating entity 104 that is coupled to one of the access units 112. A control circuit 106 drives all of the access units 112 and 114 to a state that allows simultaneous data transfer at least between two or more of the data communicating entities 104. When a communicating entity 104 seeks to transmit data to another communicating entity 104, it sends a signal to the control circuit 106, which then configures the multiplexers 118 to create the desired data path connections. Two of the many possible simultaneous data path configurations 150 and 152 are shown in FIG. 2.

Figure 3:
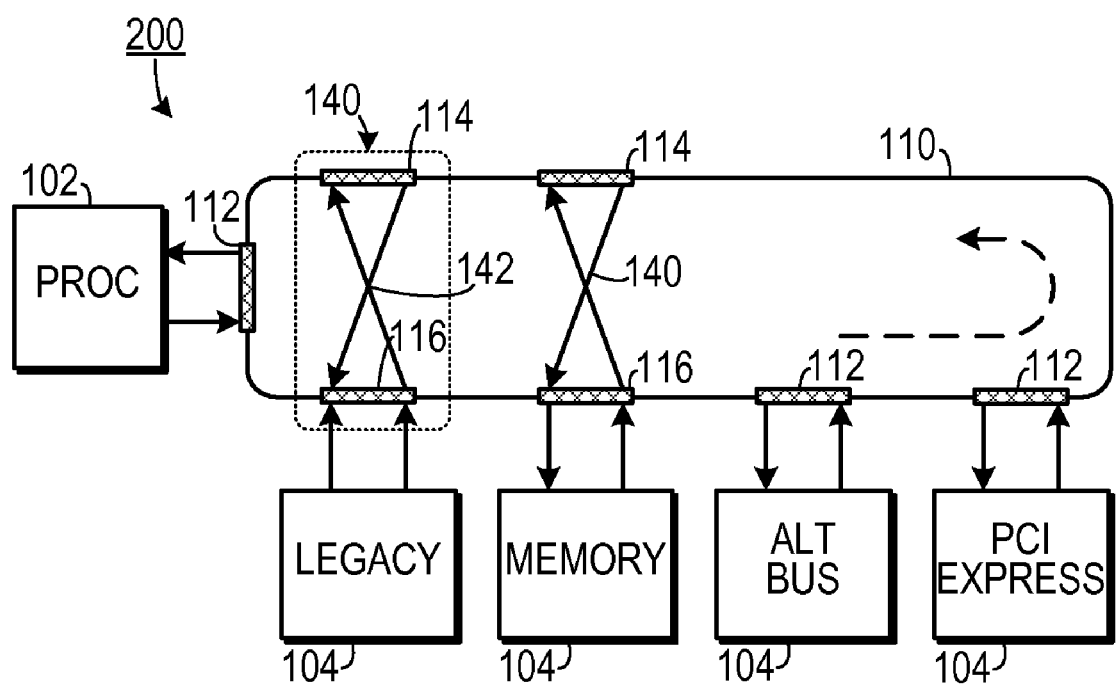
FIG. 3 is a schematic diagram of a second representative embodiment of a cross coupled unidirectional data ring.

As shown in FIG. 3, more than one cross coupling unit 140 may be employed to increase the number of possible data paths used in the system 200.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for facilitating transfer of data, comprising:
  a. a single unidirectional data communication ring;
  b. a plurality of controllable access units spaced apart and coupled to the data communication ring, each access unit including a ring input, a secondary input, a ring output, and a secondary output, each access unit configured to couple a selected one of the ring input and the secondary input to the ring output, at least one of the controllable access units being a first cross-coupling access unit coupled to the data communication ring, the cross-coupling access unit including a ring input, a secondary input, a tertiary input, a ring output, a secondary output, and a tertiary output, the cross-coupling access unit configured to couple a selected one of the ring input and the tertiary input to the ring output, the cross-coupling access unit also configured to couple a selected one of the ring input and the tertiary input to the secondary output, the cross-coupling access unit also configured to couple a selected one of the ring input and the secondary input to the tertiary output;
  c. a plurality of data communicating entities, each entity coupled to a different controllable access unit;
  d. a first cross coupler that couples the secondary input of a selected controllable access unit to the secondary output of the first cross-coupling access unit and that couples the secondary output of the selected controllable access unit to the secondary input of the first cross-coupling access unit; and
  e. a control circuit that is configured to drive all of the access units into a predetermined state to facilitate simultaneous communication between more than two of the data communicating entities.

2. The system of claim 1, further comprising:
  a. a second cross-coupling access unit coupled to the data communication ring, the cross-coupling access unit including a ring input, a secondary input, a tertiary input, a ring output, a secondary output, and a tertiary output, the cross-coupling access unit configured to couple the ring input to a selected one of the ring output, the secondary output or the tertiary output, the cross-coupling access unit also configured to couple the secondary input to a selected one of the ring output, the secondary output or the tertiary output, the cross-coupling access unit also configured to couple the tertiary input to a selected one of the ring output, the secondary output or the tertiary output; and
  b. a second cross coupler that couples the secondary input of a second controllable access unit to the secondary output of the second cross-coupling access unit and that couples the secondary output of the second controllable access unit to the secondary input of the second cross-coupling access unit.

3. The system of claim 1, wherein one of the data communicating entities comprises a processor.

4. The system of claim 1, wherein one of the data communicating entities comprises a digital memory.

5. The system of claim 1, wherein one of the data communicating entities comprises an interface to a data bus different from the serial data ring.

6. The system of claim 1, wherein one of the data communicating entities comprises a multi-lane digital communication system.

7. The system of claim 6, wherein the multi-lane digital communication system comprises a selected one of PCI Express and Infiniband.

8. The system of claim 1, wherein one of the data communicating entities comprises a legacy communications system.

* * * * *